May 14, 1929.  H. AUCKLAND  1,713,160
GAUGE
Filed Oct. 20, 1925
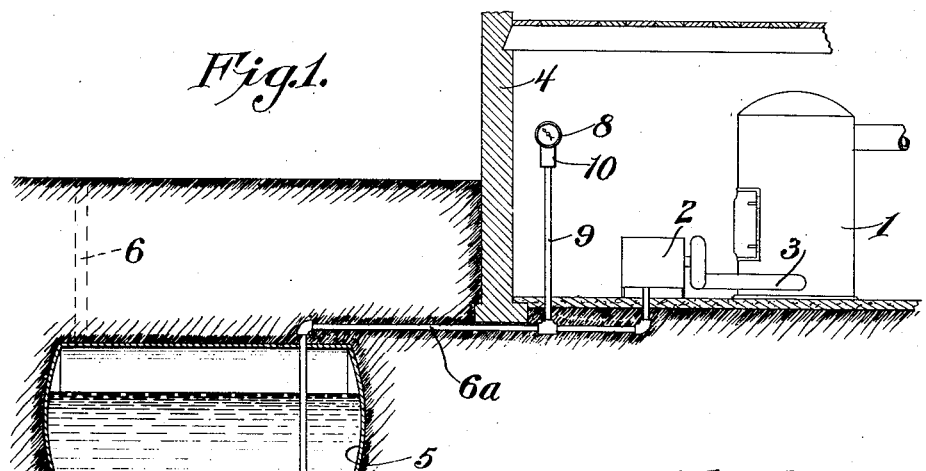
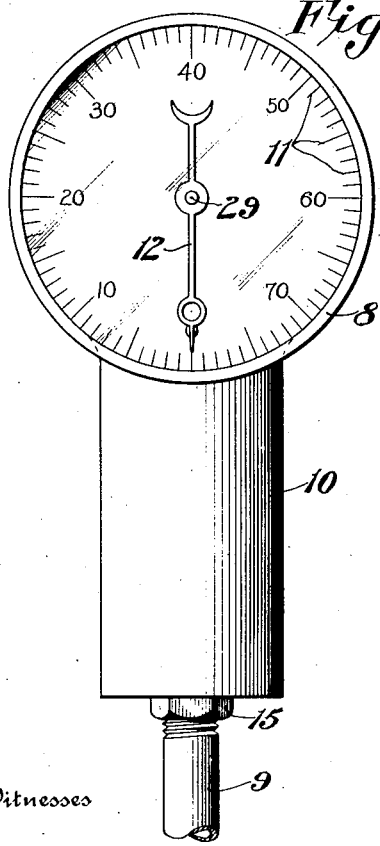
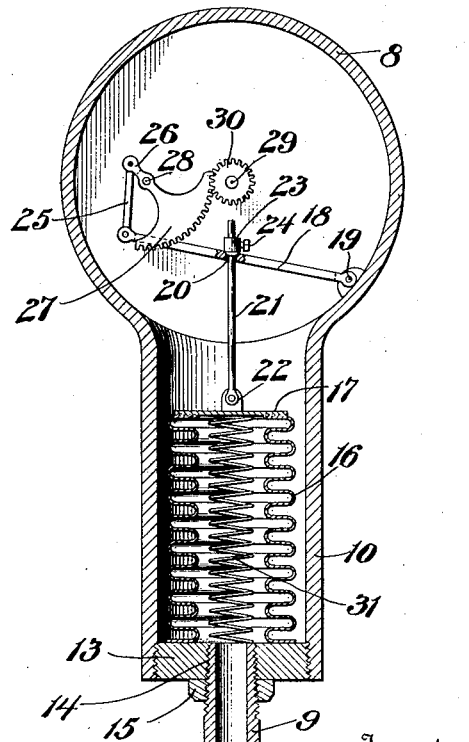
Inventor
Henry Auckland Patented May 14, 1929.

1,713,160

UNITED STATES PATENT OFFICE.

HENRY AUCKLAND, OF SEATTLE, WASHINGTON.

GAUGE.

Application filed October 20, 1925. Serial No. 63,703.

This invention relates to means for determining the amount of liquid in tanks.

The object is to provide means to be installed in connection with underground tanks such as are in use at gasoline supply stations and in domestic use for supplying crude oil, etc. for heating purposes, whereby the exact amount of oil remaining in the tank may be determined by means of a gauge which is automatically actuated by the action of the oil or other liquid under the influence of the usual pump used in connection with such outfits, said gauge having indicating means in the form of a pointer so constructed and arranged as to be held at all times at the proper point to indicate the amount of liquid remaining in the tank, whether the pump is in operation or is idle.

Another object is to provide a gauge for use in this connection which is of simple construction and yet provides for the necessary sensitiveness, said gauge being completely encased and directly connected to a stand pipe in communication with the line or supply pipe between the tank and the pump, so that the action of the liquid in passing under pressure through the same is directly imparted to the actuating mechanism forming part of said gauge.

A full and complete understanding of the invention may be obtained from a consideration of the following detailed description, taken in connection with the accompanying drawing forming a part of this specification; it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawing, in which similar reference characters designate corresponding parts throughout the several figures:

Figure 1 is a view, partly in section, of a heating plant, including a heater, a pump, and underground tank and connections, and an indicating gauge installed therein;

Figure 2 is a front elevation of the gauge;

Figure 3 is a vertical section through the same.

The heater 1, as indicated in Figure 1, may be of any type capable of the utilization of liquid fuel either for the heating of buildings or for the generation of steam, or for other purposes, and likewise the pump 2 may be of any well known form and driven by any suitable power to cause the fuel to be delivered through the vaporizer, sprayer or other feed device 3, all of which may be located within a building 4 and under control of the occupants thereof.

The tank 5, as is required by law, is buried beneath the surface of the ground and outside of the building so as to avoid all danger of explosion, and said tank, which may be built of proper sheet metal and in any approved manner to give the required strength, is adapted to be filled through a pipe 6 having a proper closure at the surface of the ground.

Leading from the pump 2 to the tank 5 is a supply pipe $6^a$ which preferably enters the top of the tank and has its open, free end 7 extending down close to the bottom thereof so as to pick up all of the contents of the same in a well-known manner.

Located within the furnace or heating room is a gauge 8 preferably elevated above the floor thereof a suitable distance to be easily read, and supported by a stand pipe 9 which passes down through the floor and is in communication with the supply pipe $6^a$ so that when the pump is started in operation to force oil or other fuel of a liquid nature into the heater 1, the passage of the said fuel along the horizontal portion of the supply pipe will cause a corresponding action of the hand or pointer of the gauge to indicate the amount of fuel in the tank so that the operator may know exactly when to replenish the same.

The gauge 2 is preferably of circular form as usual and is provided with a downwardly extending, tubular chamber 10, the front face of the gauge having appropriate scale markings or graduations 11 with the proper amounts imprinted thereon in figures or other symbols, to operate in coaction with the usual hand or pointer 12, all of which is enclosed by the usual glass face plate.

The lower end of the tubular extension 10 is provided with a head or closure 13 preferably screwed therein for facilitating the assembling of the parts of the device, and said head or closure 13 is provided with a central threaded aperture 14 for the reception of the threaded end of the stand pipe 9, the connection being tightened and sealed by a suitable lock nut 15.

Mounted upon the upper face of the head or closure 13 is a bellows 16 of well-known form in common use for such purposes, the same being formed of thin sheet metal, usually brass, and formed or pressed into a series of circumferential corrugations which freely permit the bellows to expand or contract under different degrees of pressure.

The lower end of the bellows 16 is secured to the head 13, in surrounding relation to the pipe 9 and is hermetically sealed, as by soldering or brazing and the upper end of the same is reinforced by a relatively heavy plate 17 brazed or soldered thereto to form a closure for and to strengthen the same, said upper end being located adjacent to the upper end of the aforesaid tubular extension 10, where the same communicates with the interior of the gauge casing 8.

Mounted within the gauge casing 8, and adapted to extend transversely across the lower portion of the same and in a substantially horizontal position is a rod or lever 18 having one end pivotally connected to the inner face of said casing, as indicated at 19, said lever being located directly over the center of the extension 10 and having a central aperture 20, through which there is adapted to pass a connecting rod 21, the lower end of which is pivotally connected between upstanding ears 22 carried by the plate 17.

Mounted on the upstanding, connecting rod 21 is an adjustable collar 23 held by a set screw 24, and said collar bears upon the upper face of the lever 18 so that, when the bellows or diaphragm 16 is contracted or lowered by reason of the suction of the oil or other liquid passing along the supply pipe 6ª and causing a suction in the stand pipe 9 to create a partial vacuum in the latter, the said action causes a corresponding movement or lowering of the lever 18.

The free or swinging end of the lever 18 is connected, by means of a link 25, to an arm 26 forming part of an arcuate rack 27 which is pivoted at 28, said link being pivoted at either end where connected to said lever and arm, and the latter being radially disposed with relation to the axis of rotation of the arcuate rack about the pivot 28, so that, when the lever 18 is pulled down by the action of the bellows or diaphragm a corresponding movement is imparted to the rack.

The hand or pointer 12, which is located on the outer face of the dial of the gauge, is mounted on a staff 29 extending to the interior of the gauge casing, and is there provided with a relatively small pinion 30 which is, at all times, in mesh with the arcuate rack 27, and the aforesaid movement of the latter causes the hand or pointer to register with the proper indicia upon the outer face of the dial and the latter, as well as the several parts of the indicator or gauge, are so located and adjusted as to accurately register the exact amount of liquid remaining at all times within the tank 5. A coiled spring 31 is interposed between the plate 17 and the head or closure 13 to insure a more rapid expansion of the bellows.

In setting the gauge or indicator at the time of the primary filling of the tank 5, the adjustable collar 23 is left loose upon the connecting rod 21. The pump 2 is started, assuming that the tank has been completely filled through the filling opening 8, and as the oil reaches the pump, the passage of the liquid along the pipe 6ª starts to create a partial vacuum in the stand pipe and bellows and the diaphragm starts to lower. This draws the rod 21 through the lever 18 without moving the same and consequently without any movement of the hand or pointer away from the zero mark on the dial. As the liquid begins to discharge into the burner within the heater, the nut 24 is tightened to fasten the adjustable collar upon the connecting rod 21 and the closure plate (not shown) usually employed on gauges is fastened in place, and the device is set for use at all times. The further pumping of the liquid now begins to affect the diaphragm and consequently the pointer, and the numbers or indicia on the outer face of the dial may be arranged either to show the amount of liquid remaining in the tank or the amount that has already been pumped therefrom by simply a reversal of said numbers or indicia, as will be understood. The pointer at zero indicates that the tank is full and that the pipe 6 and pump 2 are fully charged, so that as further pumping takes place, either for short periods to withdraw small quantities from the tank, or continuously, the vacuum begins to form and the hand to move. The pump is preferably of the positive displacement type so that it seals the upper end of the pipe 6ª when it is stopped and prevents air from entering to displace the liquid therein. The vacuum is maintained in the stand pipe and bellows when the pump may be stopped, by the action of the oil in the pipe 6ª in being drawn back to the tank through the influence of the partial vacuum in the upper portion thereof, when the vacuum in the pipe 6ª, stand pipe 9 and bellows 16 becomes uniform and is maintained until pumping begins again. The indicating hand remains stationary instead of dropping back to zero, and when further pumping takes place the hand is caused to advance in the same direction, thus keeping accurate account of the contents remaining in the tank.

From the foregoing it will be seen that a simple and efficient means has been provided for indicating at all times the exact amount of liquid contents remaining within a closed tank, and that the device may be easily installed in proper position in the pipe line and readily set for continuous functioning as the pumping operations take place, the said adjustment not being necessary at subsequent fillings of the supply tank.

What is claimed is:

1. In a pressure gauge, the combination with a casing having a head at one end, a pressure-reducing pipe passing through said head of a bellows within the casing and having one end connected to said head in surrounding relation to the said pipe to form a hermetic seal, a plate forming a sealed closure for the other end of the bellows, a spring within the bellows tending to expand the same, an indicator supported by the casing, and means connecting said plate to the indicator to cause the latter to measure any reduction of pressure within the bellows.

2. In a pressure gauge, the combination of a hollow extensible and contractible member, means for establishing communication between the interior of said member and the pressure to be measured, a casing within which said member is located, a staff journaled in said casing and carrying an indicator, a lever pivoted at one end to the interior of the casing and provided with an opening intermediate its ends, a connecting rod pivoted at its lower end to the extensible and contractible member and passing through the opening in the lever, a collar adjustably mounted on the upper end of the rod to bear on the lever, a pinion mounted on the indicator staff, an arcuate rack pivoted within the casing and in mesh with the pinion, and a link connecting the rack with the free end of the lever to rotate the indicator staff when said member is contracted.

3. In combination with the gauge casing, a diaphragm, a connecting rod pivoted at its lower end to the diaphragm, a collar adjustably mounted on the upper end of the rod, a lever pivoted in the gauge casing and having an opening through which the upper end of the rod is passed, the said collar bearing upon the lever, a pointer and gearing connecting the lever to the pointer to actuate the same.

In testimony that I claim the foregoing as my own, I have hereto affixed my signature.

HENRY AUCKLAND.